Oct. 10, 1944.    J. W. HOGUE    2,360,228
CLOTH SHEARING MACHINE
Filed Aug. 2, 1940    4 Sheets-Sheet 1

Inventor:
JOHN W. HOGUE, DECEASED
BY MARJORIE P. HOGUE, ADMINISTRATRIX

Attorney

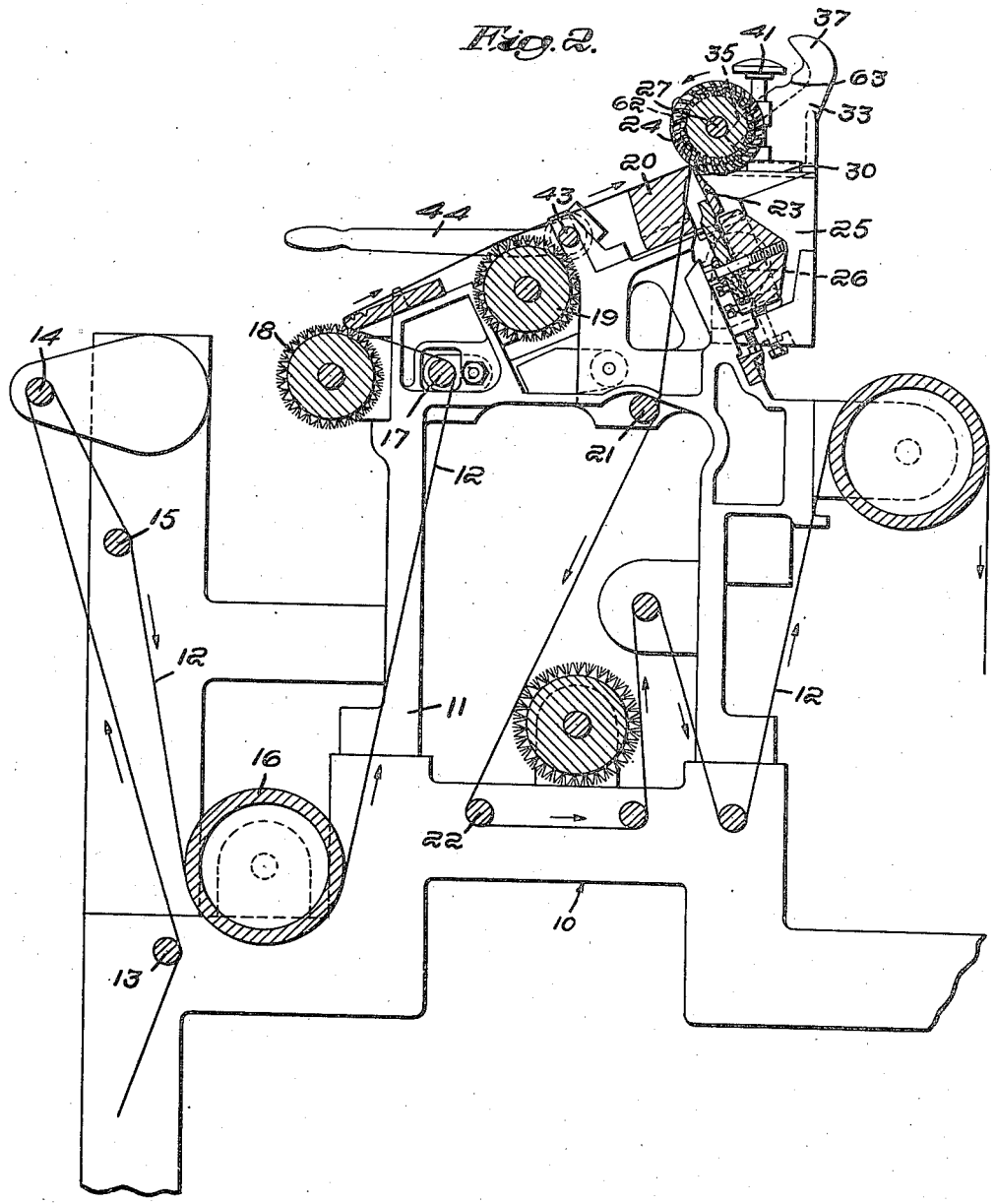

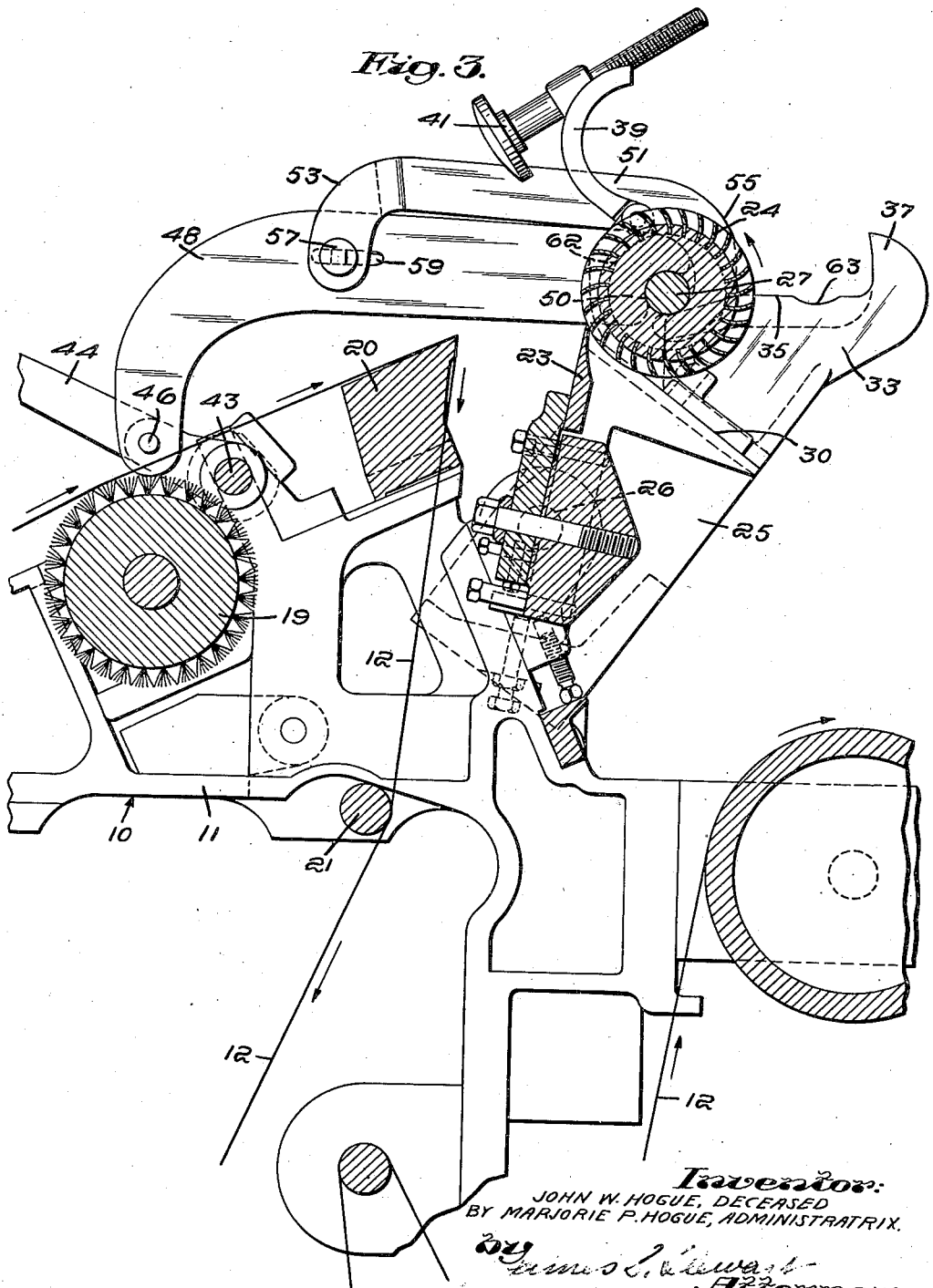

Oct. 10, 1944.                J. W. HOGUE                 2,360,228
                          CLOTH SHEARING MACHINE
                          Filed Aug. 2, 1940              4 Sheets-Sheet 4
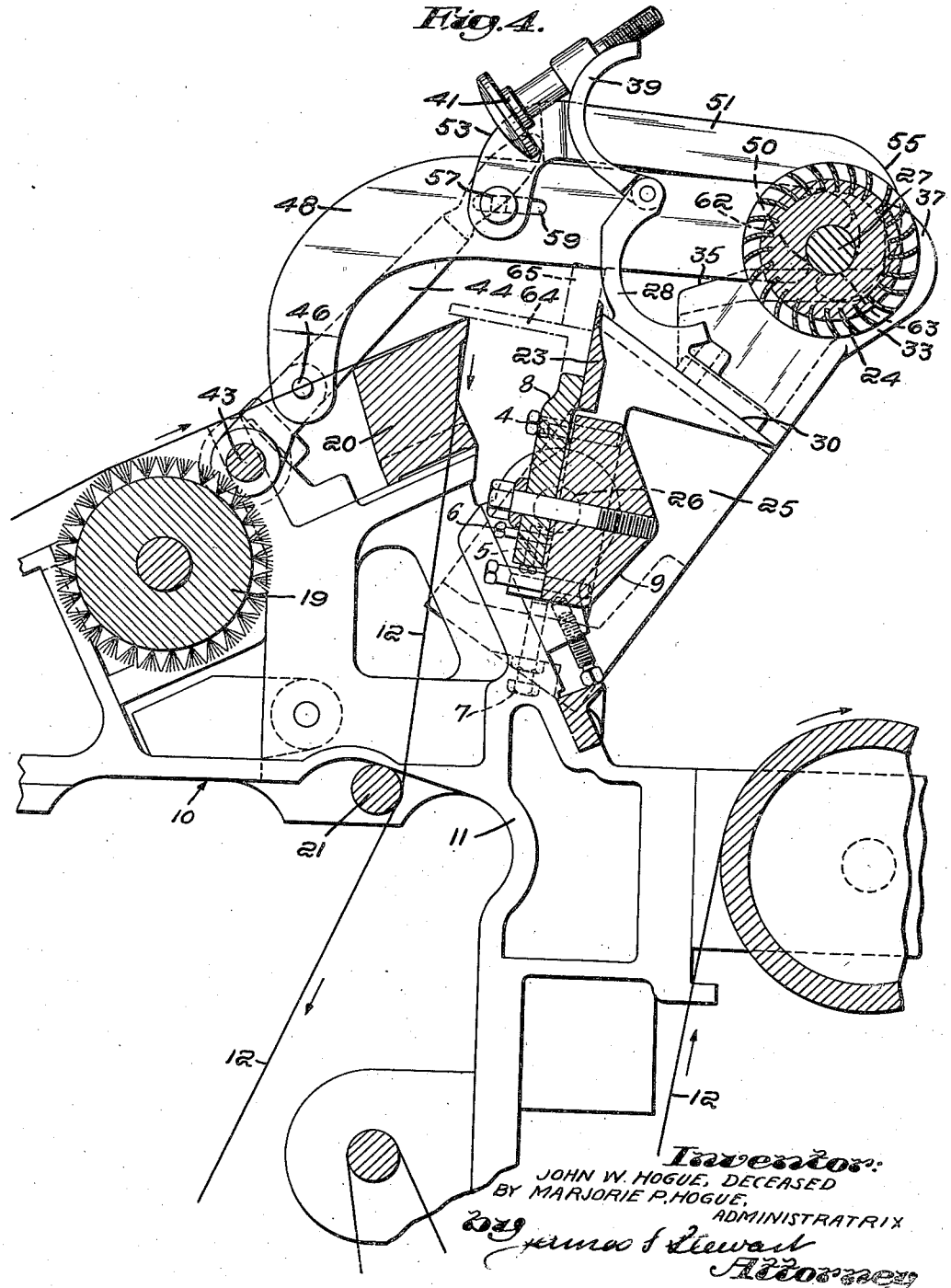

Patented Oct. 10, 1944

2,360,228

UNITED STATES PATENT OFFICE 2,360,228

CLOTH SHEARING MACHINE

John W. Hogue, deceased, late of Springfield, Vt., by Marjorie P. Hogue, administratrix, Springfield, Vt., assignor to Parks and Woolson Machine Company, Springfield, Vt., a corporation Application August 2, 1940, Serial No. 349,572

23 Claims. (Cl. 26—15)

This invention relates to cloth shearing machines and more especially to cloth shearing machines wherein the shearing is accomplished through the use of shearing couples each consisting of a rotary fly blade and a stationary ledger blade.

The usual fly blade is provided with from 12 to 26 helical cutters extending from end to end thereof in circumferentially spaced relation these cutters co-operating with a stationary relatively flat straight edge knife or ledger blade to shear or crop threads on the surface of cloth which cloth is presented to the action of the shearing couple by a cloth rest over which the cloth passes. Since the ledger blade has but a single cutting edge, as against the 12 to 26 cutting edges of the fly blade, it is obvious that the ledger blade will become dulled by the action of the cloth fibres much sooner than the cutting edges of the fly blade. As a result it is the common practice to hone the hard tool steel cutting edge of a ledger blade to restore its keenness, the honing being done at regular intervals or at any event upon any indication of pulling of the fibres of the cloth by the cutters.

In order that the cutting edge of the ledger blade may be reached for honing purposes it must not only be separated from the cloth rest but likewise from the fly blade. Since it is common practice to mount the fly and ledger blades so that they may be separated from the cloth rest in order to permit a seam or the like to pass, the problem of separating the cloth rest and ledger blade is quite easy but the separation of the fly and ledger blades presents considerable difficulty.

The fly and ledger blades are usually mounted on a blade frame which frame is pivoted on trunnions in the main frame of the machine for movement of the cutters towards and away from the cloth rest. It is not convenient to strip the ledger blade from this blade frame partly for the reason that the blade requires careful adjustment into cutting position with respect to both the fly blade and cloth, the practice being to remove the fly blade from the blade frame. For this purpose the bearings and other parts associated with the fly blade are opened up or stripped to the point where the fly blade may be lifted out of place, the removal of the blade being sometimes accomplished through the use of hoists but more often by men stationed one at each end of the fly blade shaft. As the fly blades weigh from 250 to 350 pounds apiece, must be handled at arm's length, and are often high up in the machines, the act of lifting a fly blade out of its bearings or restoring the same thereto is extremely difficult. Moreover, while chain hoists and the like are more convenient than the removal of the blades by hand, they are more expensive and require permanent fixtures rigged for each blade, these fixtures, hoists, etc., being more or less in the way. Furthermore hoists, etc., require the use of two men during the removal of a fly blade, one to operate the hoist and the other to guide the blade.

One of the more general objects of the present invention is to bring about improvements in cloth shearing machines whereby a fly blade may be readily separated from its associated ledger blade by a single operator and without the use of hoists or other devices external of the machine.

A feature of the invention resides in a temporary rest for a fly blade, said rest being positioned on the shearing machine in spaced relation to the normal position of the fly blade shaft, together with means for guiding and supporting the fly blade for motion out of its normal bearings to and from the temporary rest.

A further feature of the invention resides in a simple type of mechanism adapted to move a fly blade, with respect to its bearings, to or from a temporary position spaced from said bearings a sufficient distance to afford ample clearance of the ledger blade to permit honing of the cutting edge thereof.

Another feature of the invention resides in a simple form of mechanism adapted to perform the above results and which, during the normal operation of the machine, in no way obstructs or impedes the usual functions thereof.

To these and other ends, the invention resides in the novel features and combinations of parts to be hereinafter fully described and claimed.

In the drawings,

Fig. 2 is a vertical sectional view of the cloth shearing machine of Fig. 1;

Fig. 3 is a view similar to Fig. 2 but on an enlarged scale and showing the parts of the machine ready for movement of the fly blade into its temporary position, and Fig. 4 is a view similar to Fig. 3 but showing the fly blade moved into temporary position with the ledger blade cleared for honing purposes.

Figure 1:
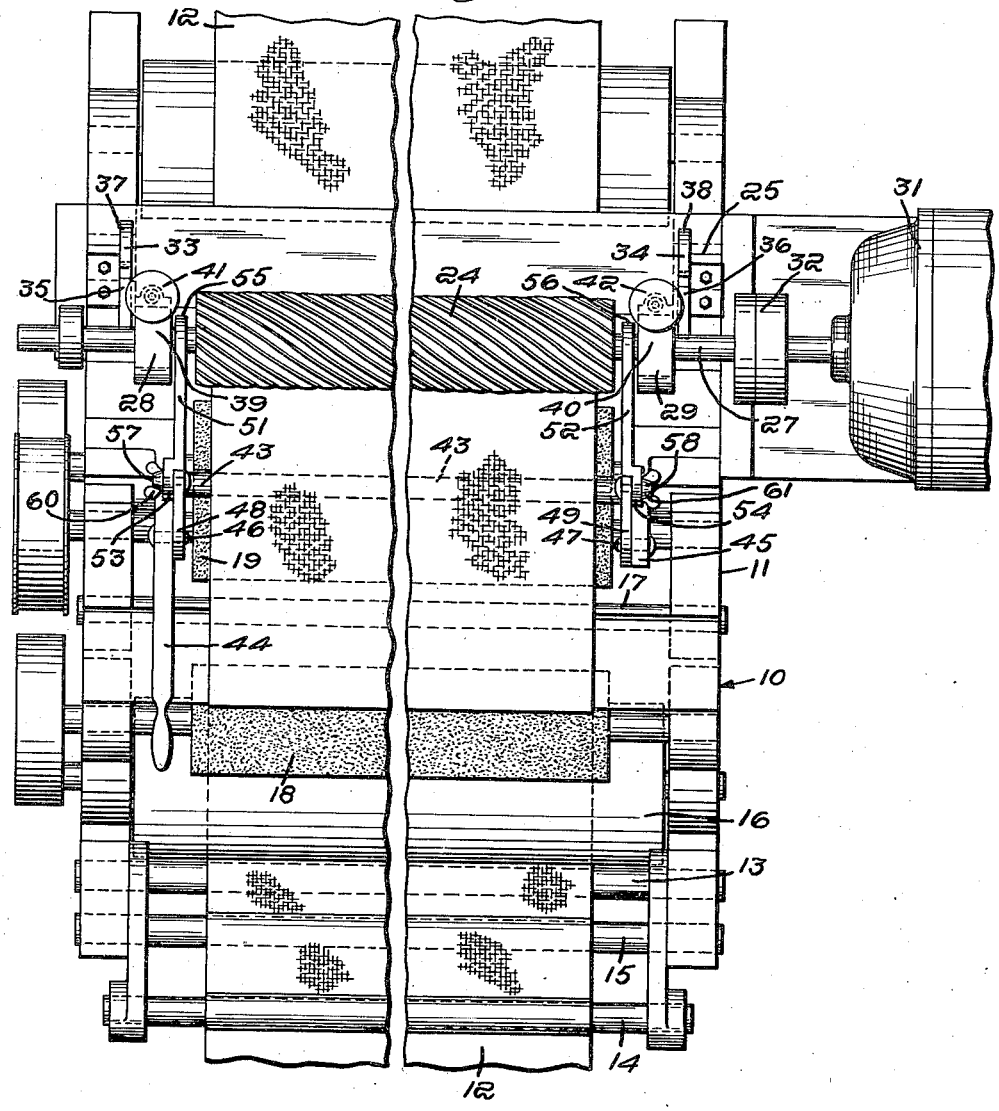
Fig. 1 is a plan view of a cloth shearing machine partly broken away but showing the improvements of the invention according to a preferred form thereof.
Figure 5:
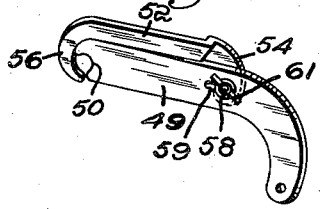
Fig. 5 is a detail view of one arm and link set for the fly blade shaft.

Referring to the drawings in which a preferred embodiment of the invention is shown for illustrative purposes, the reference numeral 10 indicates, in general, a cloth shearing machine which machine includes a main frame 11 on which are mounted the usual operative parts many of which have been omitted as they form no part of the invention and are not necessary for a proper understanding thereof. In the machine of the drawings the cloth is indicated at 12 and passes over guides such as 13, 14 and 15 to a feed roll 16, thence over the guide 17 to the brush 18 and the brush 19 and over the cloth rest 20, from which it passes over guides 21, 22, etc., and out of the machine.

In this instance the cloth rest 20 is fixed, relative movement of the cloth rest and shearing couple, to pass seams or the like, being accomplished by mounting the ledger blade 23 and the fly blade 24 on a blade frame 25 which blade frame is pivoted, for movement on the main frame about a transverse axis, on trunnions 26 at the opposite ends of the blade frame. Any suitable or preferred form of hand operated or power operated mechanism for swinging the blade frame, and thus the shearing couple, away from and then back into position at the cloth rest to pass seams or the like may be used, but since such types of mechanisms are well known in the art and form no part of the invention they are not shown herein. The shaft 27 of the fly blade 24 is supported for rotation in bearing boxes 28 and 29 mounted on the blade frame 25 near the opposite ends of the upper face 30 thereof, the fly blade being driven by electric motor 31 through a coupling 32, the motor being supported from the blade frame so that it may swing with the fly blade during any movement of the latter towards or away from the cloth rest. Provision is made for the customary small movement of the ledger blade 23 toward and from the fly blade 24 to put them in proper cutting relation, by the usual screws 4, 5, 6, 7, adjusting and securing the blade-holder 8 to its support 9.

The structure described up to this point does not differ greatly from cloth shearing machines well konwn in the art; and in accordance with the prior practice, whenever it is desired to hone the ledger blade, the motor would be uncoupled and the fly blade released from its bearing boxes, whereupon the fly blade would be lifted out of the machine.

According to the present invention such removal of the fly blade out of the machine is avoided and provision made within the machine itself for motion of the fly blade towards and away from the ledger blade to provide the necessary clearance for honing. To this end there is mounted on the back of the blade frame 25, rearwardly of the fly blade, a pair of runways 33 and 34, the runways being supported on the upper surface 30 of the blade frame at each of the ends of the fly blade just beyond the bearing boxes 28 and 29, the runways having upper surfaces 35 and 36 respectively which extend from points just under the fly blade shaft to a distance rearwardly of the machine and terminate at upwardly extending arms or stops 37 and 38 at the rearmost ends of the runways.

It will be observed that the caps 39 and 40 of the bearing boxes 28 and 29 which receive the bearings 62 on shaft 27 are hinged on the boxes at points near the upper inner sides thereof and open the boxes along diametrical planes extending downwardly and rearwardly of the boxes. In other words, when the cap screws 41 and 42 of the boxes are unscrewed, the caps 39 and 40 may be swung upwardly to open the boxes at their sides directed towards the runways 33 and 34. It will be apparent that with the bearings thus opened and the fly blade shaft uncoupled from the motor, the fly blade may be moved rearwardly of the blade frame, the fly blade shaft being supported on the runways as the fly blade moves away from the ledger blade.

Extending transversely of the machine and mounted in suitable bearings on the main frame 11 is a shaft 43 on one end of which, the left end as viewed in Fig. 1, a hand lever 44 is fixed, a crank arm 45 being secured on the opposite end of the shaft at the right hand side of the machine. Fixed in the hand lever 44 and crank arm 45 are inwardly extending studs or pins 46 and 47 on which are pivotally supported the inner ends of links 48 and 49, the outer ends of the links having formed therein semi-circular seats 50 which receive therein the fly blade shaft 27, the outer ends of the links being held in position on the fly blade shaft by arms 51 and 52 mounted at their inner ends on the links 48 and 49 respectively, the outer ends 55 and 56 of the arms being of hook-like form and extending downwardly around the shaft 27 at the opposite side thereof from the seats 50, the links and arms co-operating to embrace the shaft throughout an arc of substantially 360°. Although the links and arms are at the sides of the machine where they do not interfere with the normal operation thereof and might be left in place it is preferred to remove the same when they are not in use, one set of arms and links thus being capable of use for any number of shearing couples. In order that the links and arms may be readily assembled on or removed from the fly blade shaft, the inner ends 53 and 54 of the arms are mounted on the links by means of bolts 57 and 58 which pass through elongated slots 59 in the links, winged nuts 60 and 61 on the bolts being loosened to permit movement of the arms on the links to effect engagement or disengagement of the hook-like ends 55 and 56 with the shaft 27. When the links and arms are free from the shaft 27, the links may be moved off the studs 46 and 47 and lifted out of the machine.

The operation of the mechanism described above is relatively simple. Assuming that the blade frame is swung back into open position, as indicated in Fig. 3, the links and arms are assembled in position on the studs 46 and 47 and embracing the fly blade shaft 27 whereupon the bearing caps 39 and 40 are opened and the motor uncoupled from the shaft 27. The hand lever 44 is now swung upwardly in the direction of the fly blade whereupon the links 48 and 49 will move the fly blade rearwardly away from the ledger blade, forcing the bearings 62 out of their respective boxes and rolling the fly blade on its shaft 27 along the upper surfaces 35 and 36 of the runways 33 and 34 until the shaft rests in the arcuate seats 63 near the rearward ends of the surfaces 35 and 36 of the runways. The fly blade will now be in the position shown in Fig. 4 of the drawings and it will be readily seen that a honing rest 64 may be placed in position in the machine and the hone 65 applied to the ledger blade. Inasmuch as the ledger blade is now clear of the cloth rest and the fly blade, its cutting edge may be reached fully for such treatment as is necessary to restore its keenness. When the ledger blade has been sharpened, the rest 64 may be removed whereupon the hand lever 44 may be swung downwardly away from the ledger blade to bring the fly blade shaft out of the seats 63 and to roll the shaft along the runways 33 and 34 until the bearings 62 are again in their boxes 28 and 29 whereupon the caps 39 and 40 may be swung into place and clamped by the cap screws 41 and 42. The coupling 32 is now restored into normal engagement with the motor 31 and the process of shearing started again. It will be noted that during the movement of the shaft 27 out of the seats 63 and along the runways, the hook-like ends of the arms are depended on for applying the necessary pressure to the shaft. Excessive movement of the fly blade shaft along the runways rearwardly from its bearings is prevented by the upwardly extending stops 37 and 38 at the rearward ends of the runways.

Those skilled in the art will understand that only one man is necessary to effect the operations described above as the fly blade is under full control at all times, the use of links engaging the fly blade shaft at the opposite ends thereof insuring that the motion of the fly blade will be constantly in a direction parallel to itself. The positions of the upper surfaces 35 and 36 of the runways, when the blade frame is swung back into open position, is such that the movement of the fly blade is substantially in a horizontal direction so that very little effort is required to move the same.

Those skilled in the art will readily be able to adapt the features of the invention to various forms of cloth shearing machines in addition to the example shown in the drawings and it will be understood that where such machines include axial oscillators, swabs and other mechanisms associated with the fly blade, it is contemplated that these will be disconnected or moved out of the way of the fly blade prior to the movement of the latter on the runways. Thus while a preferred embodiment of the invention is shown and described in detail it will be understood that the invention is not limited thereto but is capable of variation and modification within the scope of the appended claims.

What is claimed is:

1. The combination in a cloth shearing machine of a ledger blade, a fly blade, means for effecting relative motion of the ledger and fly blades towards and away from one another to put such blades in cutting relation, and additional mechanical means moving the ledger and fly blades out of cutting relation with each other to permit sharpening of the ledger blade.

2. The combination in a cloth shearing machine of shearing means and means for supporting the cloth for action of the shearing means, one of said means being mounted for movement away from the other to permit the passage of a seam in the cloth, said shearing means comprising a fly blade mounted in bearings and a ledger blade, and mechanical means on said machine for moving the fly blade out of its bearings and away from the ledger blade to permit honing of the latter.

3. The combination in a cloth shearing machine of a fly blade, bearings therefor, and a ledger blade, and means for moving the fly blade towards and away from its bearings and thus towards and away from the ledger blade.

4. The combination in a cloth shearing machine of a ledger blade, a fly blade shaft having a fly blade fixed thereon, bearings for supporting the fly blade shaft for rotation, and means movably mounted on the machine for moving the fly blade out of its bearings and away from the ledger blade upon release of the fly blade shaft from its bearings.

5. The combination in a cloth shearing machine of shearing means and means for supporting the cloth for action of the shearing means, one of said means being mounted for movement away from the other means to permit the passage of a seam in the cloth, said shearing means comprising a fly blade and a ledger blade, means adjusting the ledger blade toward and from the fly blade, and means movably mounted on said machine for supporting the fly blade for movement away from the ledger blade to permit the latter to be honed.

6. The combination in a cloth shearing machine of shearing means comprising a fly blade and a ledger blade, means adjusting the ledger blade toward and from the fly blade, means on said machine for supporting the fly blade for movement away from the ledger blade to permit honing of the latter, and means on said machine for effecting such movement of the fly blade while on said supporting means.

7. The combination according to claim 5 in which the fly blade supporting means comprises runways on said machine.

8. The combination according to claim 6 in which the fly blade supporting means comprises runways on said machine.

9. The combination in a cloth shearing machine of a cloth rest, a blade frame, a ledger blade mounted on said frame, a fly blade on said frame cooperating with the ledger blade to shear cloth passing over the cloth rest, means for supporting the blade frame for movement of the ledger and fly blades away from the cloth rest to pass seams in the cloth, means adjusting the ledger blade and fly blade toward and from each other to put them in cutting relation, and means on the blade frame for supporting the fly blade for motion away from the ledger blade into inoperative position to permit honing of the ledger blade.

10. The combination according to claim 9 in which said supporting means for the fly blade comprises runways on the blade frame.

11. The combination in a cloth shearing machine of a cloth rest, a blade frame, a ledger blade on the frame, a fly blade including a shaft, bearings for supporting the fly blade shaft on the blade frame for rotation of the fly blade, means for supporting the blades and cloth rest providing for relative movement of the ledger and fly blades with respect to the cloth rest to permit passage of a seam in the cloth, and means on the blade frame for supporting the fly blade for motion of the fly blade shaft out of its bearings and away from the ledger blade.

12. The combination according to claim 11 in which the last named means comprises runways on the blade frame adapted to support the fly blade shaft upon movement of the latter out of its bearings.

13. The combination in a cloth shearing machine of a cloth rest, a blade frame, a ledger blade on the frame, a fly blade including a shaft, bearings for supporting the fly blade shaft on the blade frame for rotation of the fly blade, means for supporting the blade frame for movement of the fly and ledger blades away from the cloth rest to permit passage of a seam in the cloth, means on the blade frame for supporting the fly blade for motion of the fly blade shaft out of its bearings and away from the ledger blade and means on the machine adapted to engage the fly blade shaft to effect such motion.

14. The combination according to claim 13 in which the last named means comprises links adapted to engage the fly blade shaft and means for effecting motion of the links.

15. The combination according to claim 13 in which the last named means comprises a shaft extending transversely of the machine, cranks on the ends of the shaft, links mounted on the cranks and engaging the fly blade shaft and means for swinging the cranks to effect motion of the links.

16. In a cloth shearing machine, in combination, a fly blade, a ledger blade, means adjusting the ledger blade and fly blade accurately and within narrow limits toward and from each other, and additional mechanical means moving the fly blade out of its bearings and away from the ledger blade and also into its bearings and toward the ledger blade.

17. The combination in a cloth shearing machine of a cloth rest, a blade frame, a ledger blade mounted on said frame, a fly blade on said frame cooperating with the ledger blade to shear cloth passing over the cloth rest, means providing for relative movement of the fly and ledger blade with respect to the cloth rest to pass seams in the cloth, means on the blade frame for supporting the fly blade for movement away from the ledger blade into inoperative position to permit honing of the ledger blade, links transmitting such movement to the fly-blade shaft, and means on the machine connected with the links for effecting motion of the latter to move the fly blade on the said fly-blade supporting means.

18. The combination in a cloth shearing machine of shearing means comprising a fly blade and a ledger blade, means movably mounted on said machine moving one blade away from the other to permit honing and back into cutting relation with the other after such separation, and means determining the setting of one of the two blades with respect to the other when the cutting relation is resumed.

19. The combination in a cloth shearing machine of shearing means comprising a fly blade and a ledger blade, quick-acting mechanical means movably mounted on said machine moving one blade widely away from the other to give easy access to the ledger blade for the purpose of honing the latter, and restoring the blades to cutting relation with each other after such separation, and additional means controlling the setting of one of the blades with respect to the other when in cutting relation and reestablishing such setting without change when the blades are brought together again by the said quick-acting means.

20. In a cloth shearing machine, in combination, a fly blade and a ledger blade, means movably mounted on the machine moving one blade away from the other to permit honing and bringing the blades together again after such separation, and means adjusting the setting of one of the blades with respect to the other when in cutting relation with each other and automatically reestablishing the previous setting when the blades are brought together again after the said separation.

21. In a cloth shearing machine, in combination, a fly blade, a ledger blade, means adjusting the ledger blade and fly blade accurately and within narrow limits toward and from each other to establish correct cutting relation, and additional mechanical means mounted on the machine moving the fly blade away from the ledger blade to permit honing of the latter and effecting return of the fly blade into the said cutting relation with the ledger blade.

22. The combination in a cloth shearing machine of shearing means comprising a fly blade and a ledger blade, means adjusting one of these blades toward and away from the other to put them in cutting relation, and means on the cloth shearing machine for supporting the fly blade for motion away from the ledger blade into inoperative position to permit honing of the ledger blade.

23. The combination in a cloth shearing machine of shearing means comprising a fly blade and a ledger blade, means adjusting one of these blades toward and away from the other to put them in cutting relation, means on the cloth shearing machine for supporting the fly blade for motion away from the ledger blade into inoperative position to permit honing of the ledger blade, and means holding the fly blade away from the ledger blade after being moved into inoperative position.

MARJORIE P. HOGUE,
*Administratrix of Estate of John W. Hogue, Deceased.*